United States Patent
Akita (10) Patent No.: US 7,294,685 B2
(45) Date of Patent: Nov. 13, 2007

(54) SULFONATED POLYPHOSPHAZENE DERIVATIVE AND METHOD FOR PRODUCING THE SAME

(75) Inventor: Hiroshi Akita, Iruma-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 537 days.

(21) Appl. No.: 10/893,187

(22) Filed: Jul. 16, 2004

(65) Prior Publication Data

US 2005/0014927 A1 Jan. 20, 2005

(30) Foreign Application Priority Data

Jul. 16, 2003 (JP) ............................. 2003-275137

(51) Int. Cl.
*C08J 5/20* (2006.01)
*C08G 79/02* (2006.01)
(52) U.S. Cl. ..................... 528/399; 521/25; 521/33
(58) Field of Classification Search ............... 252/500; 528/168, 399; 521/25, 33
See application file for complete search history.

(56) References Cited

U.S. PATENT DOCUMENTS 5,548,060 A * 8/1996 Allcock et al. ............. 528/487

6,365,294 B1 * 4/2002 Pintauro et al. ............. 429/33

OTHER PUBLICATIONS

Tang et al "Polyphosphazene Membranes. IV. Polymer Morphology and Proton Conductivity in Sulfonated Poly[bis(3-methylphenoxy)phosphazine]Films", Journal of Applied Polymer Scinces, 79(1), pp. 49-59.*
"Evaluation of methanol crossover in proton-conducting polyphosphazene membranes", Material Letters, Jan. 2002, vol. 52, pp. 192-196.
"Sulfonated Polyphosphazene ion-exchange membranes", Journal of Membrane Science 1996, vol. 119, pp. 155-160.

* cited by examiner

*Primary Examiner*—Mark Kopec
(74) *Attorney, Agent, or Firm*—Lahive & Cockfield, LLP; Anthony A. Laurentano, Esq.

(57) ABSTRACT

A polyphosphazene derivative and an aromatic ring compound are bonded to one another to obtain an intermediate product. Subsequently, anhydrous sulfuric acid is added in such an amount that the molar ratio is 2 to 8 with respect to a repeating unit of the intermediate product. Further, $SO_3$ and the intermediate product are reacted with each other to sulfonate the intermediate product. The sulfonation is performed under a condition in which the temperature range is $-20$ to $0°$ C. and the total time is 5 to 30 hours. Accordingly, a sulfonated polyphosphazene derivative is obtained, in which the number average molecular weight is not less than 25,000 and the ion exchange capacity exceeds 3.0 mmol/g.

15 Claims, 4 Drawing Sheets

FIG. 2

| EXAMPLE | CONDITION OF SULFONATION | | | CHARACTERISTICS OF PRODUCT | |
|---|---|---|---|---|---|
| | REACTION TEMPERATURE (°C) | SO$_3$ PER POLYPHOSPHAZENE REPEATING UNIT (MOLAR RATIO) | REACTION TIME (HOUR) | NUMBER AVERAGE MOLECULAR WEIGHT | ION EXCHANGE CAPACITY (mmol/g) |
| 1 | -10 | 4.2 | 20 | 40000 | 4.7 |
| 2 | 0 | 5 | 20 | 35000 | 4.9 |
| 3 | -5 | 5 | 20 | 42000 | 4.7 |
| 4 | -10 | 5 | 20 | 42000 | 4.7 |
| 5 | 0 | 6 | 20 | 32000 | 4.9 |
| 6 | -5 | 6 | 20 | 38000 | 4.9 |
| 7 | -10 | 6 | 20 | 40000 | 4.9 |

FIG. 4

| COMPARATIVE EXAMPLE | CONDITION OF SULFONATION | | | CHARACTERISTICS OF PRODUCT | |
|---|---|---|---|---|---|
| | REACTION TEMPERATURE (°C) | SO₃ PER POLYPHOSPHAZENE REPEATING UNIT (MOLAR RATIO) | REACTION TIME (HOUR) | NUMBER AVERAGE MOLECULAR WEIGHT | ION EXCHANGE CAPACITY (mmol/g) |
| 1 | 20 | 2.1 | 3 | 15000 | 3.9 |
| 2 | 20 | 2.3 | 3 | 17000 | 4.4 |
| 3 | 20 | 2.6 | 3 | 13000 | 4.1 |
| 4 | 20 | 3 | 3 | 9000 | 4.5 |
| 5 | 20 | 4.2 | 3 | 13000 | 4.9 |
| 6 | 20 | 5 | 3 | 8200 | 4.9 |
| 7 | 20 | 6.2 | 3 | 7700 | 5.0 |
| 8 | 20 | 8.3 | 3 | 4400 | 5.2 |

SULFONATED POLYPHOSPHAZENE DERIVATIVE AND METHOD FOR PRODUCING THE SAME

BACKGROUND OF THE INVENTION

1. Field of the Invention

The present invention relates to a sulfonated polyphosphazene derivative, which is a proton conductor capable of being adopted, for example, as a solid polymer electrolyte membrane or a solid polymer ion exchange membrane for a fuel cell, and a method for producing the same.

2. Description of the Related Art

A proton conductor such as a perfluorosulfonic acid polymer membrane is used, for example, as a material for an electrolyte to be interposed between an anode electrode and a cathode electrode of a fuel cell. The hydrogen ion (proton), which is produced by the ionization of hydrogen contained in a fuel gas supplied to the anode electrode, is moved by the electrolyte to the cathode electrode. Such movement occurs even at a relatively low temperature.

The proton conductivity of the perfluorosulfonic acid polymer membrane is lowered, as the membrane becomes drier. Therefore, when the fuel cell is constructed by using an electrolyte composed of a perfluorosulfonic acid polymer membrane, for example, steam is contained in the fuel gas to be supplied to the anode electrode and/or the oxygen-containing gas to be supplied to the cathode electrode, so that the membrane is continuously replenished with water. However, in this case, the system is large-scaled, because the fuel cell is additionally equipped with a humidifier for producing steam.

Sulfonated polyphosphazene is exemplified as another proton conductor by Mark V. Fedkin et al. in "Evaluation of methanol crossover in proton-conducting polyphosphazene membranes," Material Letters, January 2002, Vol. 52, pp. 192-196. Sulfonated polyphosphazene is known as a cation exchange resin. The larger the ion exchange capacity is, the larger the moisture-absorbing ability becomes, in the same manner as general cation exchange resins. In other words, in this case, the ability to absorb water in atmospheric air, and water produced by operation of the fuel cell, are enhanced. Therefore, it is possible to ensure proton conductivity without providing any additional humidifier. However, the ion exchange capacity of sulfonated polyphosphazene is about 1.1 to 1.6 mmol/g, which is somewhat low, and its moisture-absorbing ability is poor.

On the other hand, a production method is disclosed in "Sulfonated polyphosphazene ion-exchange membranes," Journal of Membrane Science, 1996, Vol. 119, pp. 155-160, written by Ryszard Wycisk et al. In this method, anhydrous sulfuric acid is added within a range in which $SO_3$ of anhydrous sulfuric acid is 0.6 to 1.9 in molar ratio per repeating unit of a polyphosphazene derivative, followed by performing a reaction at room temperature for 3 hours to obtain a sulfonated polyphosphazene derivative. In this document, it is reported that the sulfonated polyphosphazene derivative, which has a maximum ion exchange capacity of 3.0 mmol/g, is obtained.

However, in the case of the method described in this document, not only the phenyl group as a side chain of the polyphosphazene derivative, but also the N=P bond for constructing the principal chain is also sulfonated during the process to effect the sulfonation. For this reason, the principal chain is dissociated, and the number average molecular weight of the polyphosphazene derivative is decreased. In a solid polymer type fuel cell, gas pressure is allowed to differ between both electrodes in order to improve power generation efficiency in some cases. In such a situation, durability is deteriorated with the membrane being composed of a polymer having a small number average molecular weight.

The maximum theoretical value of ion exchange capacity is 4.9 mmol/g when the two phenyl groups are sulfonated and N of the principal chain is not sulfonated. However, as of yet, no sulfonated polyphosphazene derivative has been known having an ion exchange capacity exceeding 3 mmol/g.

That is, it is difficult to increase both ion exchange capacity and the number average molecular weight of a sulfonated polyphosphazene derivative. For this reason, no sulfonated polyphosphazene derivative has yet been obtained, which is excellent in moisture-absorbing ability together with exhibiting high proton conductivity.

SUMMARY OF THE INVENTION

A general object of the present invention is to provide a sulfonated polyphosphazene derivative, which has a large number average molecular weight and a large ion exchange capacity, which exhibits excellent proton conductivity even when a humidified state is not artificially maintained, and which can be used as a preferred material for an electrolyte of a fuel cell.

A principal object of the present invention is to provide a sulfonated polyphosphazene derivative, which has a high strength when a membrane is prepared therewith, which makes it possible to operate a fuel cell provided with the membrane as an electrolyte over a long period of time, and which makes it possible to improve the power generation efficiency of the fuel cell.

Another object of the present invention is to provide a sulfonated polyphosphazene derivative, which is excellent in moisture-absorbing ability and which makes it possible to operate a fuel cell without providing any additional humidifier, when the derivative is used as an electrolyte of the fuel cell.

Still another object of the present invention is to provide a method for producing the sulfonated polyphosphazene derivative as described above.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A detailed explanation will be made below with reference to the accompanying drawings, concerning a sulfonated polyphosphazene derivative of the present invention, together with a method for producing the same, as exemplified in preferred embodiments.

A sulfonated polyphosphazene derivative according to an embodiment of the present invention is a polymer having the following structural formula A.

X1:$SO_3H$
X2:$SO_3H$, H
Examples of $Y_1$, $Y_2$:H, $CH_3$, $C_2H_5$, F, Cl, Br In the structural formula A, X1 represents a sulfonic acid ($SO_3H$) group, and X2 represents $SO_3H$ or H. Y1 and Y2 may be H, or Y1 and Y2 may be an alkyl group or a halogen group. Proton conductivity is enhanced when Y1 and Y2 are alkyl groups or halogen groups, which is preferred. Examples of the alkyl group may include a methyl ($CH_3$) group or an ethyl ($C_2H_5$) group. Examples of the halogen group may include an F group, a Cl group, and a Br group.

In this embodiment, the number average molecular weight of the sulfonated polyphosphazene derivative represented by the structural formula A exceeds 25,000, and is generally 30,000 to 45,000. In the case of the sulfonated polyphosphazene derivative, having a large number average molecular weight as described above, the principal chain is lengthy as compared with the sulfonated polyphosphazene derivative described in the aforementioned document written by Ryszard Wycisk et al. Because the strength of the membrane composed of the sulfonated polyphosphazene derivative is ensured, therefore durability of the membrane is also ensured, and consequently the membrane has a long service life.

The ion exchange capacity of the sulfonated polyphosphazene derivative exceeds 3.0 mmol/g. In general, the ion exchange capacity exceeds 4.5 mmol/g, and sometimes arrives at the maximum theoretical value of 4.9 mmol/g, depending on the type of functional group bonded to the phenyl group. When N of the principal chain is also sulfonated simultaneously with the phenyl group of the side chain, the ion exchange capacity exceeds 5.0 mmol/g. Therefore, in the case of the sulfonated polyphosphazene derivative according to the embodiment of the present invention, it is postulated that only the phenyl group of the side chain is sulfonated, while N of the principal chain is not sulfonated.

The sulfonated polyphosphazene derivative, which has a large ion exchange capacity as described above, is excellent in moisture-absorbing ability. That is, the humidified state is spontaneously established by absorbing water from atmospheric air along with water produced by power generation. Therefore, for example, when the membrane, which is composed of the sulfonated polyphosphazene derivative, is used as an electrolyte of a fuel cell, the fuel cell can be operated without providing any additional humidifier.

As described above, in the sulfonated polyphosphazene derivative according to the embodiment of the present invention, the number average molecular weight is large, and the ion exchange capacity is large as well. Therefore, excellent proton conductivity is exhibited even when a humidified state is not artificially retained. Specifically, sulfonated poly[bis(3-methylphenoxy)phosphazene], in which X2 is $SO_3H$ and Y1 and Y2 are methyl groups bonded at 3-positions in the structural formula A shown below, exhibits a proton conductivity exceeding $8.0 \times 10^{-3}$ S/cm under a condition of 100° C. in atmospheric air.

In the structural formula described above, the sulfonic acid group may be positioned at any one of 2-positions, 4-positions, 5-positions and 6-positions.

Next, an explanation will be made concerning a production method to obtain the sulfonated polyphosphazene derivative represented by the structural formula A and exemplified by sulfonated poly[bis(3-methylphenoxy)phosphazene], as described above.

Figure 1:
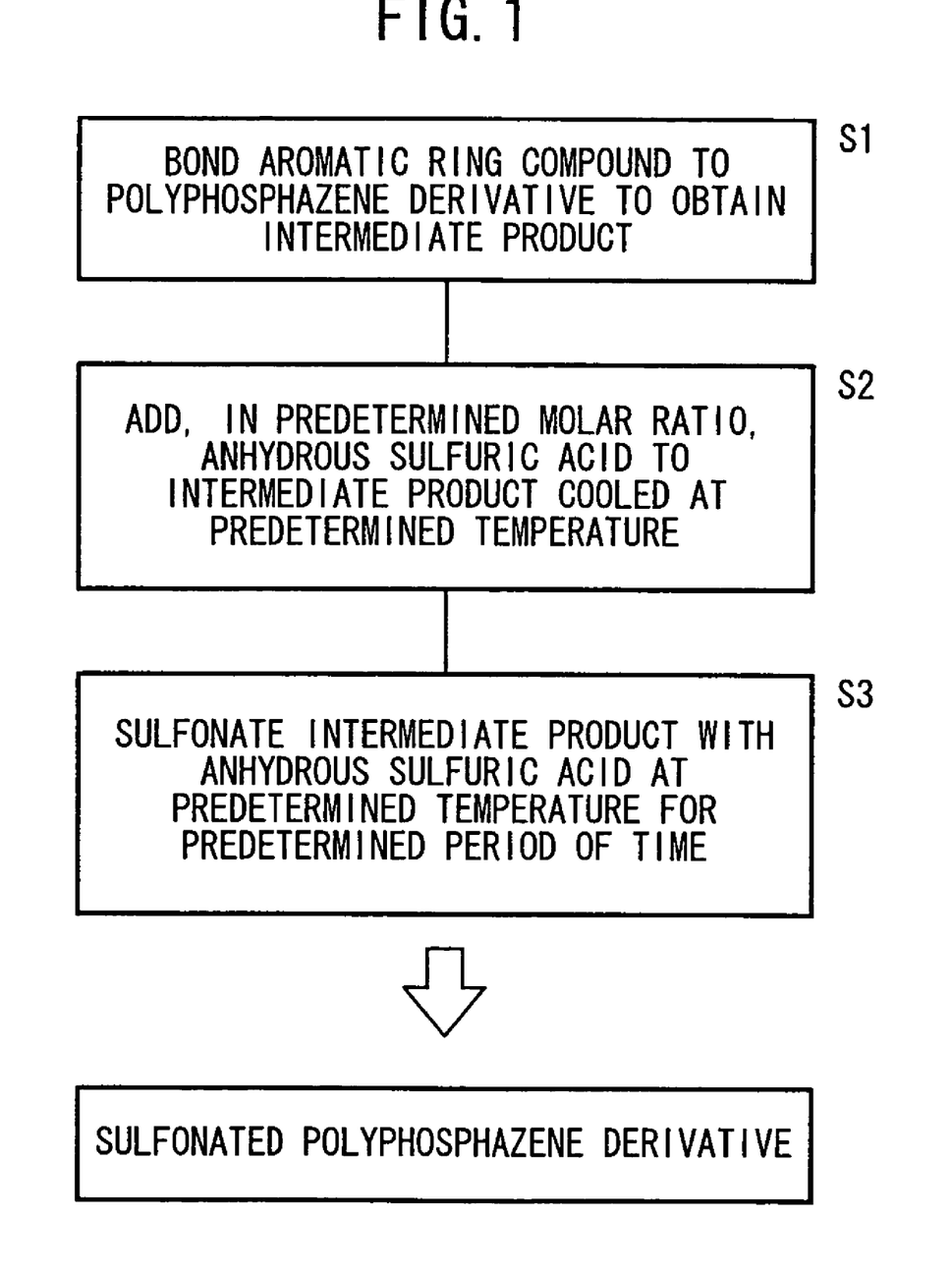
FIG. 1 shows a flow chart illustrating a method for producing sulfonated poly[bis(3-methylphenoxy)phosphazene] as a polyphosphazene derivative according to an embodiment of the present invention.

As shown in a flow chart in FIG. 1, the production method according to the embodiment of the present invention comprises a first step S1 of bonding an aromatic ring compound to a polyphosphazene derivative to obtain an intermediate product, a second step S2 of adding anhydrous sulfuric acid to the intermediate product, and a third step S3 of sulfonating the intermediate product with the anhydrous sulfuric acid.

Initially, in the first step S1, a polyphosphazene derivative having an N=P bond in the principal chain is bonded to an aromatic ring compound. The polyphosphazene derivative is not specifically limited therein. However, dichloropolyphosphazene having the following structural formula may be offered as a preferred example.

Further, in this case, an m-cresol sodium salt, having the following structural formula, is selected as the aromatic ring compound.

For example, tetrahydrofuran is used as a solvent, with dichloropolyphosphazene dissolved therein, and to this solution, a tetrahydrofuran solution of m-cresol sodium salt and tetra-n-butylammonium bromide are added dropwise to prepare a mixed solution. Thereafter, dichloropolyphosphazene is reacted with m-cresol sodium salt by agitating the mixed solution at 120 to 200° C. for 10 to 24 hours in the presence of tetra-n-butylammonium bromide. Thus, the reaction proceeds in accordance with the following reaction formula (1). In this procedure, tetra-n-butylammonium bromide improves the solubility of polymers produced in the solvent.

That is, poly[bis(3-methylphenoxy) phosphazene] is produced, in which methylphenol groups are bonded as side chains via ether groups (—O—) to the principal chain having the N=P bond. The poly[bis(3-methylphenoxy) phosphazene] is dissolved beforehand in dichloroethane to prepare a solution, and the solution is cooled so that the temperature is −20 to 0° C.

Subsequently, in the second step S2, anhydrous sulfuric acid is added to the solution.

In this procedure, anhydrous sulfuric acid is added in a state in which the solution is maintained within a temperature range of −20 to 0° C. If the temperature is lower than −20° C., then the solubilities of poly[bis(3-methylphenoxy) phosphazene] and anhydrous sulfuric acid in dichloroethane are lowered, and both substances become separated out from the solution. For this reason, it is difficult to obtain sulfonated poly[bis(3-methylphenoxy)phosphazene] having a large ion exchange capacity.

On the other hand, if the temperature exceeds 0° C., anhydrous sulfuric acid attacks N, which constitutes the principal chain of poly[bis(3-methylphenoxy)phosphazene]. As a result, the number average molecular weight of sulfonated poly[bis(3-methylphenoxy)phosphazene] is decreased, because the principal chain is dissociated. That is, the proton conductivity of the obtained sulfonated poly[bis(3-methylphenoxy)phosphazene] is decreased. A more preferable temperature range for the solution, to be adopted when anhydrous sulfuric acid is added, is −10 to −5° C.

Anhydrous sulfuric acid is added in such an amount that the molar ratio of $SO_3$ is 2 to 8 with respect to one repeating unit of bis(3-methylphenoxy)phosphazene, which acts as a repeating unit of poly[bis(3-methylphenoxy)phosphazene]. If anhydrous sulfuric acid is added in such an amount that this molar ratio is less than 2, then the sulfonation of the methylphenyl group advances only slightly, because the stoichiometric ratio of $SO_3$ is small compared with the methylphenyl group, and therefore it is difficult to obtain sulfonated poly[bis(3-methylphenoxy)phosphazene] having a large ion exchange capacity.

On the other hand, if anhydrous sulfuric acid is added in such an amount that this molar ratio exceeds 8, anhydrous sulfuric acid exists excessively and attacks N, which constitutes the principal chain of poly[bis(3-methylphenoxy) phosphazene]. As a result, the proton conductivity of the sulfonated poly[bis(3-methylphenoxy)phosphazene] becomes poor, in the same manner as described above. The molar ratio of anhydrous sulfuric acid to be added is more preferably 4 to 7.

Subsequently, in the third step S3, a reaction is advanced between anhydrous sulfuric acid and poly[bis(3-methylphenoxy)phosphazene] in accordance with the following reaction formula (2). In this procedure, the temperature of the mixed solution is maintained at −20 to 0° C., and preferably −10 to −5° C., in the same manner as described above. As a result of this reaction, the methylphenyl group of the side chain of poly[bis(3-methylphenoxy)phosphazene] is sulfonated, and consequently sulfonated poly[bis(3-methylphenoxy)phosphazene] is obtained.

The total time required for the second and third steps S2 and S3 is within a range of 5 to 30 hours. If the total time is less than 5 hours, sulfonation is not advanced sufficiently. On the other hand, if the total time exceeds 30 hours, proton conductivity of the obtained sulfonated poly[bis(3-meth- ylphenoxy)phosphazene] is poor, because anhydrous sulfuric acid attacks N of the principal chain of poly[bis(3-methylphenoxy)phosphazene].

In the embodiment described above, poly[bis(3-methylphenoxy)phosphazene] is obtained as an intermediate product by using an m-cresol sodium salt. However, another intermediate product can be obtained by using a different metal salt. For example, when sodium salt of 3-chlorophenol is used, then poly[bis(3-chlorophenoxy)phosphazene] is obtained as an intermediate product, and finally sulfonated poly[bis(3-chlorophenoxy)phosphazene] is obtained.

Solvents usable for dissolving poly[bis(3-methylphenoxy)phosphazene] as the intermediate product may include, for example, dichloroethane as well as tetrahydrofuran and dioxane.

EXPERIMENT

Phosphonitric chloride was recrystallized with n-heptane to obtain a product which was accommodated in a glass ample tube, followed by being degassed and then sealed. The glass ample tube was heated at 250° C. for 72 hours in a reaction furnace. Accordingly, phosphonitric chloride was polymerized to obtain dichloropolyphosphazene, as shown in the following reaction formula (3).

(3)

Dichloropolyphosphazene was taken out from the glass ample tube in an Ar atmosphere, and the dichloropolyphosphazene was dissolved in benzene. The obtained solution was poured into n-heptane to produce a coagulate. The coagulate was collected, and thereafter dried in a vacuum at room temperature, to obtain solid dichloropolyphosphazene. Further, 5.5 g of the obtained dichloropolyphosphazene was dissolved in 150 ml of tetrahydrofuran, to prepare a first solution.

On the other hand, 16.1 g of m-cresol was dissolved in 100 ml of tetrahydrofuran to obtain a solution to which 6.0 g of NaH, having a concentration of 60% by weight dissolved in a solvent of paraffin, was added to prepare an m-cresol sodium salt. Further, 0.26 g of tetra-n-butylammonium bromide was added to this solution in order to prepare a second solution.

Subsequently, the second solution was added dropwise to the first solution to effect mixing, and thus a mixed solution was prepared. The mixed solution was introduced into an autoclave and maintained at 150° C. while performing agitation. Thus, the reaction represented by the reaction formula (1) was advanced.

After 20 hours, the mixed solution was poured into a solvent composed of 4 ml of concentrated HCl and 2 liters of deionized water, to induce precipitation of poly[bis(3-methylphenoxy)phosphazene]. Subsequently, the precipitated deposit was dried in a vacuum to obtain solid poly[bis(3-methylphenoxy)phosphazene]. The obtained poly[bis(3-methylphenoxy)phosphazene] had a number average molecular weight of 49,000.

Further, 5 g of the obtained poly[bis(3-methylphenoxy)phosphazene] was dissolved in 250 ml of dichloroethane to prepare a third solution. The third solution was cooled to −10° C.

On the other hand, anhydrous sulfuric acid, in such an amount that the molar ratio of $SO_3$ was 4.2 with respect to bis(3-methylphenoxy)phosphazene as the repeating unit of poly[bis(3-methylphenoxy)phosphazene], was dissolved in 50 ml of dichloroethane, in order to prepare a fourth solution.

Subsequently, the fourth solution was added dropwise to the third solution over 2 hours. Thereafter, agitation was performed while maintaining the temperature at −10° C. to advance a sulfonation reaction. After 20 hours, deionized water was added to the solution to stop the sulfonation reaction. Further, the organic solvent was removed at a reduced pressure. Thus, a solution was obtained, made up of sulfonated poly[bis(3-methylphenoxy)phosphazene] dissolved in deionized water.

This solution was introduced and sealed in a dialysis tube for purification, which was immersed in deionized water for 48 hours. Accordingly, sulfuric acid and other compounds were removed from the solution, and deionized water was removed at a reduced pressure, followed by drying. As a result, a flake-shaped sulfonated poly[bis(3-methylphenoxy)phosphazene] compound was obtained. This compound was designated as Example 1.

The number average molecular weight of the sulfonated poly[bis(3-methylphenoxy)phosphazene] of Example 1 was measured by means of gel permeation chromatography. As a result, the number average molecular weight was 40,000. Further, 1 g of the sulfonated poly[bis(3-methylphenoxy)phosphazene] was dissolved in 100 ml of deionized water, which was titrated with a 0.25 N NaCl aqueous solution to determine the ion exchange capacity. As a result, it was revealed that the ion exchange capacity was 4.7 mmol/g, which was extremely large.

Further, other examples of sulfonated poly[bis(3-methylphenoxy)phosphazene] were obtained in the same manner as in Example 1, while variously changing, for example, the molar ratio of $SO_3$ in the fourth solution and the temperatures during agitation, both upon and after the addition of the third solution to the fourth solution. These compounds were designated as Examples 2 to 7.

Figure 2:
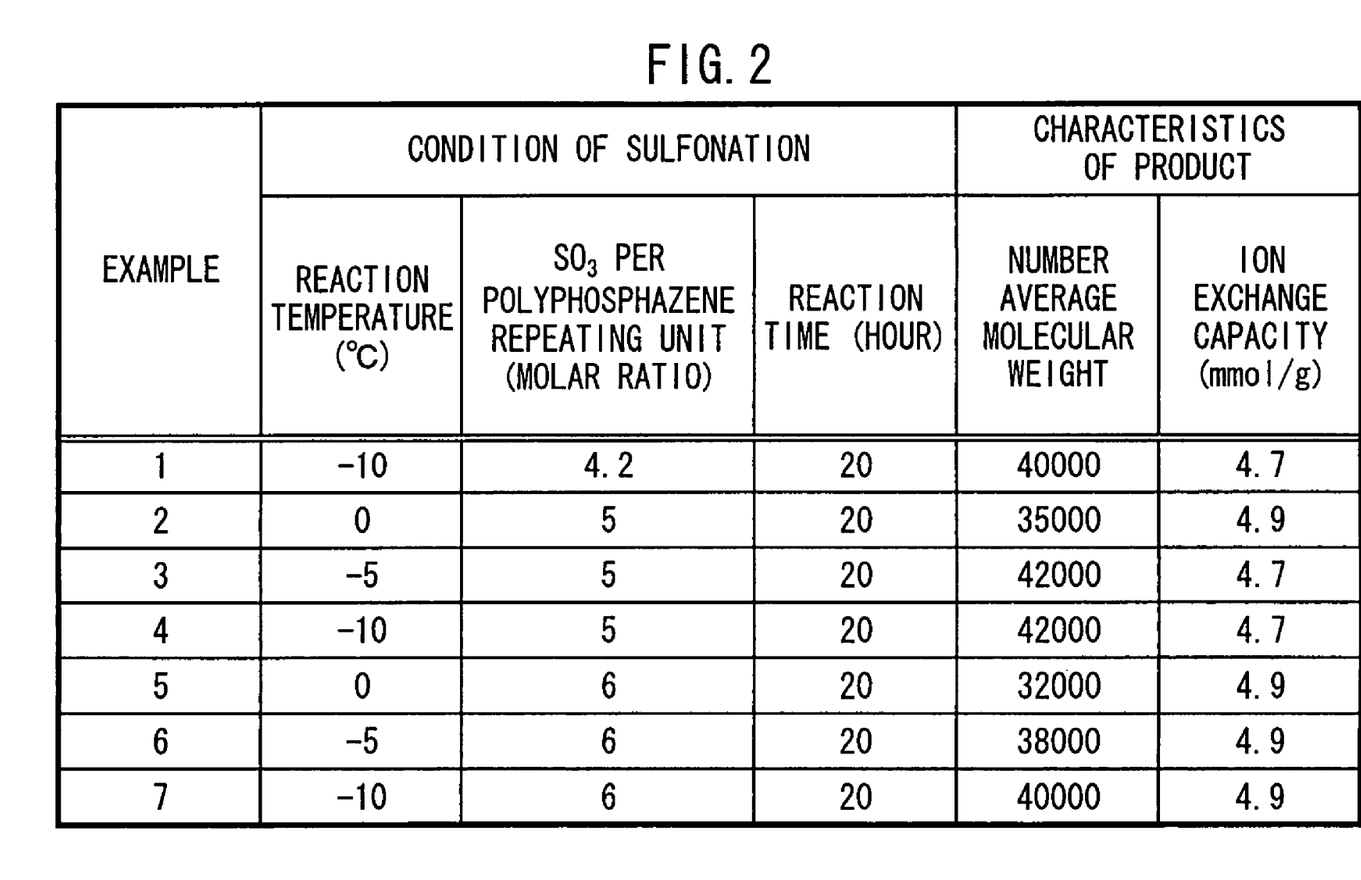
FIG. 2 shows a table illustrating the number average molecular weights and the ion exchange capacities of sulfonated poly[bis(3-methylphenoxy)phosphazene] prepared in Examples 1 to 7, in relation to the reaction temperature and the molar ratio of added $SO_3$.

The number average molecular weight and the ion exchange capacity were also measured for the sulfonated poly[bis(3-methylphenoxy)phosphazene] of Examples 2 to 7 in the same manner as described above. Obtained results are shown in FIG. 2 together with those obtained in Example 1, in combination with the temperature and the molar ratio of $SO_3$. According to FIG. 2, it is appreciated that the number average molecular weights of the sulfonated poly[bis(3-methylphenoxy)phosphazene] of Examples 1 to 7 are not decreased so much, as compared with the number average molecular weight (49,000) of poly[bis(3-methylphenoxy)phosphazene] as the intermediate product. That is, sulfonated poly[bis(3-methylphenoxy)phosphazene], having the relatively large number average molecular weight, was obtained by suppressing dissociation of the principal chain of the intermediate product, by allowing the molar ratio of $SO_3$, the reaction temperature, and the total time required for the addition and the reaction to occur, to be within the predetermined ranges.

According to FIG. 2, it is appreciated that the ion exchange capacities of obtained sulfonated poly[bis(3-methylphenoxy)phosphazene] exhibited extremely large values of 4.7 to 4.9 mmol/g. In particular, the maximum theoretical value is 4.9 mmol/g. Therefore, in this case, it is postulated that substantially all of the methylphenyl groups are sulfonated.

The powder of sulfonated poly[bis(3-methylphenoxy) phosphazene] of Example 3 was subjected to compression molding at a pressing force of about 14 MPa by using a hand press forming machine to obtain a disk-shaped product having a diameter of 6 mm and a thickness of 0.5 mm.

The disk-shaped product was dried at 80° C. for 12 hours in a vacuum atmosphere, followed by being exposed to a low humidity environment at a relative humidity of 25% at 85° C. for 24 hours. The ratio of moisture absorption was determined from the change in weight, before and after exposure. As a result, a high value of 55% was exhibited. This means that the disk-shaped product has a high moisture-absorbing ability, and that the formed product absorbs moisture in atmospheric air to spontaneously retain a humidified state with ease.

Figure 3:
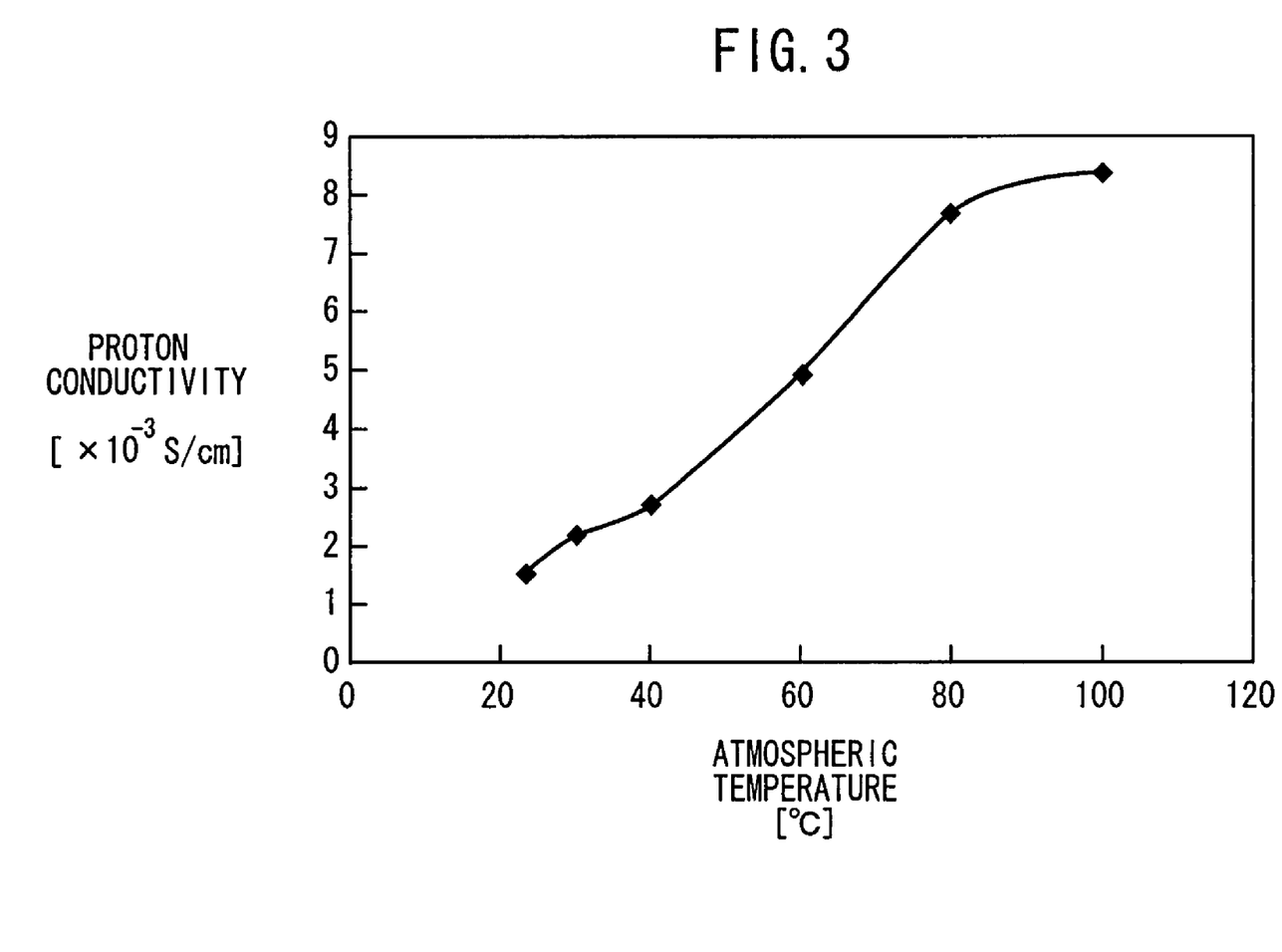
FIG. 3 shows a graph illustrating the proton conductivity of sulfonated poly[bis(3-methylphenoxy)phosphazene] prepared in Example 3.

The proton conductivity of the disk-shaped product immediately after drying was measured in atmospheric air by means of the two-terminal high frequency impedance method. The temperature range was 20 to 100° C. The obtained result is shown in FIG. 3. According to FIG. 3, it is clear that sulfonated poly[bis(3-methylphenoxy)phosphazene] obtained as described above exhibits excellent proton conductivity in non-humidified atmospheric air.

For purposes of comparison, several examples of sulfonated poly[bis(3-methylphenoxy)phosphazene] were synthesized in accordance with the method described in the foregoing document written by Ryszard Wycisk et al. Specifically, 5 g of poly[bis(3-methylphenoxy)phosphazene] synthesized in accordance with Example 1 was dissolved in 250 ml of dichloroethane.

Figure 4:
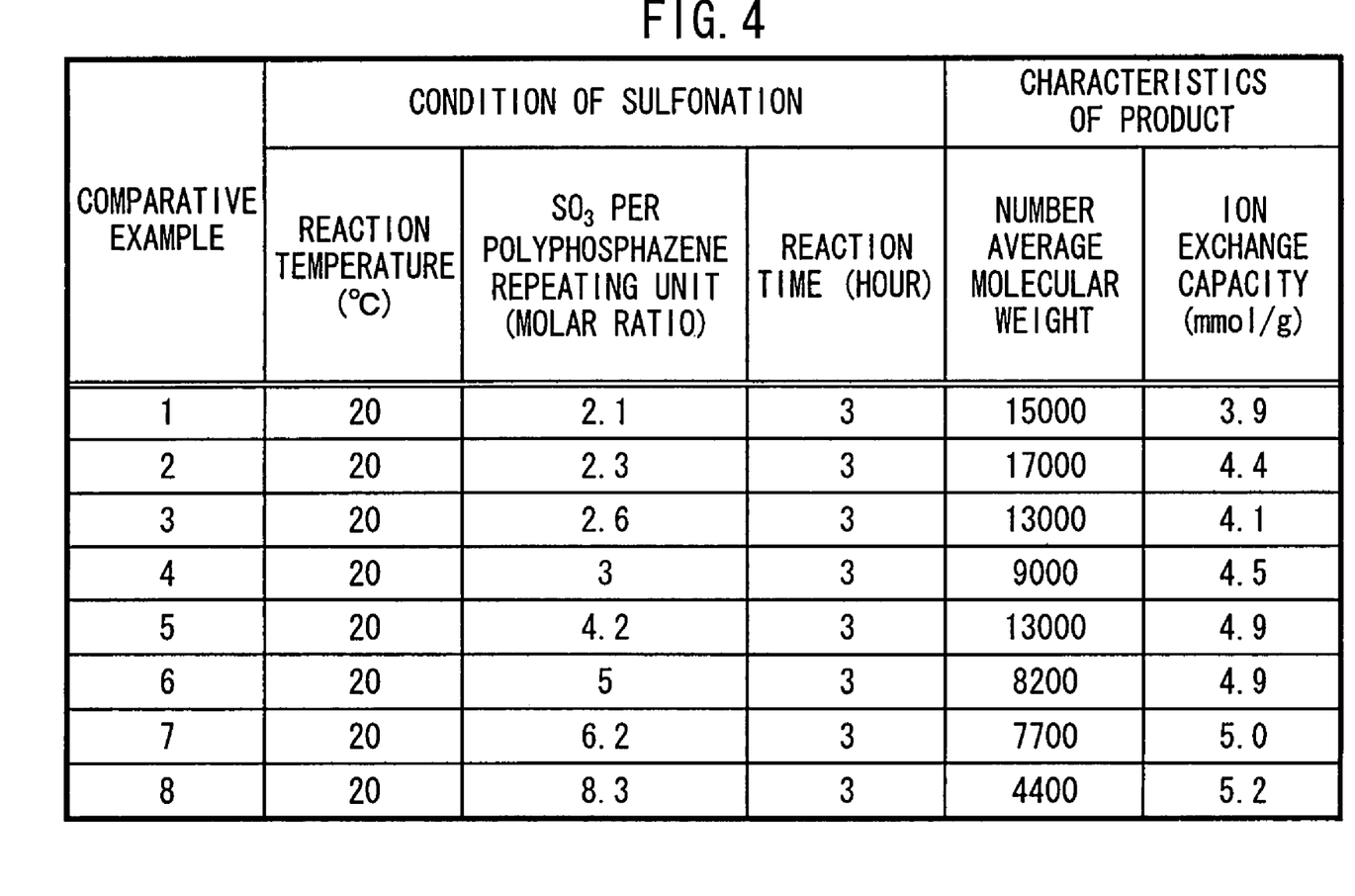
FIG. 4 shows a table illustrating the number average molecular weights and the ion exchange capacities of sulfonated poly[bis(3-methylphenoxy)phosphazene] prepared in Comparative Examples 1 to 8, in relation to the reaction temperature and the molar ratio of added $SO_3$.

Solutions, which were obtained by dissolving anhydrous sulfuric acid in 50 ml of dichloroethane, while variously changing the molar ratio of $SO_3$ as shown in FIG. 4, were added dropwise over 2 hours to the solution described above, and retained at about 20° C. After that, agitation was performed for 3 hours at room temperature to advance sulfonation.

After that, the same operation as that performed for Examples 1 to 7 was performed to obtain flake-shaped sulfonated poly[bis(3-methylphenoxy)phosphazene]. These compounds are designated as Comparative Examples 1 to 8.

The number average molecular weights and the ion exchange capacities of the sulfonated poly[bis(3-methylphenoxy)phosphazene] of Comparative Examples 1 to 8 are shown in combination in FIG. 4. In this case, it is clear that the number average molecular weight is decreased dramatically, as compared with the number average molecular weight of poly[bis(3-methylphenoxy)phosphazene] as the intermediate product. That is, according to this procedure, the sulfonic group attacks the N=P bond of the principal chain to cause dissociation. As a result, the principal chain is shortened. Such a polymer is easily dissolved in water, and it has a low strength as well. It is also difficult to form such a polymer into a membrane-shaped product.

In FIG. 4, some polymers exist, in which the number average molecular weight exceeds the maximum theoretical value of 4.9 mmol/g, probably for the following reason. That is, it is postulated that not only the methylphenyl group but also N of the principal chain becomes sulfonated. Also from this fact, it is acknowledged that the N=P bond of the principal chain is attacked by the sulfonic acid group.

Further, 3.2 g of phenol was dissolved in 70 ml of tetrahydrofuran to obtain a solution to which 1.4 g of NaH, having a concentration of 60% by weight dissolved in paraffin, was added to prepare a sodium salt of phenol. Further, 0.2 g of tetra-n-butylammonium bromide was added to this solution.

The solution obtained as described above was added dropwise at room temperature to a solution comprising 150 ml of tetrahydrofuran and 5.5 g of dichloropolyphosphazene, synthesized in accordance with the same operation as adopted in Example 1, followed by being refluxed for 6 hours.

On the other hand, 7.5 g of m-cresol was dissolved in 70 ml of tetrahydrofuran to obtain a solution to which 2.8 g of NaH having a concentration of 60% by weight dissolved in paraffin was added, to prepare an m-cresol sodium salt. Further, the tetrahydrofuran solution containing the m-cresol sodium salt was added dropwise to the refluxed solution.

The mixed solution was placed in an autoclave, and retained at 150° C. while performing agitation. Thus, poly [(3-methylphenoxy)(phenoxy)phosphazene] was synthesized. The chemical change described above is shown below as a flow.

After 20 hours, the mixed solution was poured into a solvent composed of 4 ml of concentrated HCl and 2 liters of deionized water, to induce precipitation of poly[(3-methylphenoxy)(phenoxy)phosphazene]. Subsequently, the precipitated compound was vacuum-dried to obtain solid poly[(3-methylphenoxy)(phenoxy)phosphazene]. The resultant poly[(3-methylphenoxy)(phenoxy)phosphazene] had a number average molecular weight of 48,000.

5 g of the obtained poly[(3-methylphenoxy)(phenoxy) phosphazene] was dissolved in 250 ml of dichloroethane to produce an initial solution. Another solution, in which anhydrous sulfuric acid in such an amount that the molar ratio was 4.2 with respect to one repeating unit of (3-methylphenoxy)(phenoxy)phosphazene was dissolved in 50 ml of dichloroethane, was added dropwise over 2 hours to the initial solution, in an environment at about 20° C. Thereafter, agitation was performed for 3 hours at room temperature to advance sulfonation in accordance with the following reaction formula (4) shown below.

After that, the operation was performed in the same manner as in Examples 1 to 7, to obtain flake-shaped sulfonated poly[(3-methylphenoxy)(phenoxy)phosphazene]. This compound is designated as Comparative Example 9.

The number average molecular weight of sulfonated poly[(3-methylphenoxy)(phenoxy)phosphazene] of Comparative Example 9 was 13,000, which was extremely small. The ion exchange capacity was 2.8 mmol/g, which was a small value as compared with those of Examples 1 to 7.

The moisture absorption ratio of a disk-shaped product having the same size as the inventive example, and which was manufactured in accordance with the procedure described above, was small, i.e., 13%. The proton conductivity exhibited a low value, to such an extent that its value was impossible to be measured.

The sulfonated polyphosphazene derivative of the present invention is excellent in moisture-absorbing ability, because its ion exchange capacity is large. The sulfonated polyphosphazene derivative of the present invention also exhibits excellent proton conductivity even when the sulfonated polyphosphazene derivative is not humidified. Therefore, a membrane, which is composed of the sulfonated polyphosphazene derivative, is usable, for example, as a material for a solid electrolyte of a fuel cell.

What is claimed is:

1. A sulfonated polyphosphazene derivative which has a principal chain comprising N and P bonded to one another and which has an aromatic ring as a side chain, in which a sulfonic acid group is bonded to said aromatic ring, wherein:
a number average molecular weight is not less than 25,000 and an ion exchange capacity exceeds 3.0 mmol/g.

2. The sulfonated polyphosphazene derivative according to claim 1, wherein said aromatic ring is a phenyl group which is bonded to P of said principal chain via an ether group.

3. The sulfonated polyphosphazene derivative according to claim 1, wherein a functional group other than said sulfonic acid group is further bonded to said aromatic ring.

4. The sulfonated polyphosphazene derivative according to claim 3, wherein said functional group is any one of an alkyl group and a halogen group.

5. The sulfonated polyphosphazene derivative according to claim 4, wherein said alkyl group is any one of a methyl group and an ethyl group.

6. The sulfonated polyphosphazene derivative according to claim 4, wherein said halogen group is any one of a bromo group, a chloro group, and an iodo group.

7. The sulfonated polyphosphazene derivative according to claim 1, wherein said number average molecular weight is 30,000 to 45,000.

8. The sulfonated polyphosphazene derivative according to claim 1, wherein said ion exchange capacity is 4.5 to 4.9 mmol/g.

9. The sulfonated polyphosphazene derivative according to claim 1, wherein said derivative is sulfonated poly[bis(3-methylphenoxy)phosphazene] or sulfonated poly[bis(3-chlorophenoxy)phosphazene].

10. A method for producing a sulfonated polyphosphazene derivative which has a principal chain comprising N and P bonded to one another and which has an aromatic ring as a side chain, in which a sulfonic acid group is bonded to said aromatic ring, wherein a number average molecular weight is not less than 25,000 and an ion exchange capacity exceeds 3.0 mmol/g, said method comprising:
providing an intermediate product having an aromatic ring bonded to a side chain of a polyphosphazene derivative;
adding anhydrous sulfuric acid in such an amount that a molar ratio of $SO_3$ is 2 to 8 per repeating unit of said intermediate product; and
sulfonating said derivative by reacting $SO_3$ and said intermediate product to thereby obtain said sulfonated polyphosphazene derivative, wherein:
said anhydrous sulfuric acid is added and said intermediate product is sulfonated under a condition in which a temperature range is −20 to 0° C. and a total time is 5 to 30 hours.

11. The method for producing said sulfonated polyphosphazene derivative according to claim 10, wherein said anhydrous sulfuric acid is added and said intermediate product is sulfonated within a temperature range of −15 to −5° C.

12. The method for producing said sulfonated polyphosphazene derivative according to claim 10, wherein a metal salt of any one of phenol and a phenol derivative is used as said aromatic ring compound.

13. The method for producing said sulfonated polyphosphazene derivative according to claim 12, wherein a phenol derivative, to which any one of an alkyl group and a halogen group is bonded, is used as said phenol derivative.

14. The method for producing said sulfonated polyphosphazene derivative according to claim 12, wherein a sodium salt is used as said metal salt.

15. The method for producing said sulfonated polyphosphazene derivative according to claim 10, wherein poly[bis(3-methylphenoxy)phosphazene] or poly[bis(3-chlorophenoxy)phosphazene] is prepared as said intermediate product.

* * * * *